United States Patent Office 3,290,243
Patented Dec. 6, 1966

3,290,243
BODYING ORGANIC LIQUIDS WITH COLLOIDAL CLAY AND CLAY COMPOSITION THEREFOR
Edgar W. Sawyer, Jr., Metuchen, N.J., assignor to Minerals & Chemicals Philipp Corporation, Woodbridge, N.J., a corporation of Maryland
No Drawing. Filed July 20, 1964, Ser. No. 383,948
14 Claims. (Cl. 252—28)

This invention has to do with the thickening of organic liquids with collidal clay.

Aqueous liquids can be gelled with clays by dispersing suitable colloidal clay in the liquids. Mere soaking of the clay in water suffices in the case of hydratable (expandable) clays such as Wyoming bentonite. With other clays, such as attapulgite clay (Georgia-Florida fuller's earth) or sepiolite clay, high shear agitation of the aqueous system is required. Organic liquids can also be gelled with collidal clays. In this case, however, an organic surface active agent having a long-chain hydrocarbon group should be used with the clay to obtain satisfactory results. This is especially true when working with nonpolar liquids, such as hydrocarbon oils.

Among the most efficient surface active agents heretofore used with colloidal clays in gelling organic liquids are long-chain cationic onium compounds, especially long-chain quaternary ammonium salts such as dimethyldi-octadecyl ammonium chloride. The clays are usually chemically reacted with the quaternary ammonium salts (or other onium bases) in an aqueous reaction medium to form long-chain onium clays having organophilic properties. In some systems, the onium clays are formed in situ in the presence of organic liquid. Cationic onium compounds usually give better results than analogous primary, secondary or tertiary long-chain amines unless the clay has previously been converted to a "hydrogen clay" by acidification and then used with the basic amine. In the latter case, however, the equivalent of an onium clay is formed. One detractive feature of gels formulated with onium clays is that they are not compatible with anionic surfactants. Their use, therefore, is limited to systems in which these other types of surfactants are not present. Another detractive feature is that the onium compounds have toxic properties and gels formulated with onium compounds have limited use in pharmaceutical application.

I have discovered a class of long-chain, nonionic, tertiary amine derivatives that is extremely efficient when used with naturally occurring colloidal clay in thickening organic liquids. Members of this class of compounds are generally appreciably more efficient than the tertiary amines from which they are derived. Moreover, the nonionic amine derivatives avoid certain difficulties and disadvantages of onium compounds, such as the toxicity and lack of compatibility of the onium compounds. In many instances, the amine derivatives are more effective than onium compounds derived from the same tertiary amine.

Accordingly, an object of this invention is the provision of a novel method for gelling organic liquids with colloidal clay.

Another object is to produce novel clay-bodied organic liquids of desirable properties.

Another object is to provide a treated clay product for thickening organic liquid.

A specific object is the provision of clay-bodied organic liquids which, unlike many prior clay-bodied organic liquids, are compatible with many classes of surface active agents and can be formulated successfully with these other types of surface active agents.

Briefly stated, in accordance with the instant invention, organic liquids are bodied or thickened by mixing therein a small amount of the combination of colloidal clay and a nonionic teritiary alkyl amine oxide of the following structural formula:

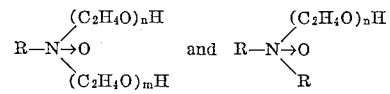

wherein R is selected from the group of alkyl and alkenyl having from 8 to 20 carbon atoms, inclusive, and preferably containing from 12 to 18 carbon atoms, inclusive, $R_1$ is selected from the group consisting of alkyl and alkoxy having from 1 to 3 carbon atoms, inclusive, and polyethoxy having from 2 to 4 ethoxy groups, inclusive, and $R_2$ is selected from the group consisting of alkyl having 1 to 20 carbon atoms, inclusive, alkenyl having 8 to 20 carbon atoms, inclusive, alkoxy having 1 to 3 carbon atoms, inclusive, and polyethoxy having from 2 to 4 groups, inclusive.

Groups representative of R in the formula are lauryl, myristyl, stearyl and tallow.

It is also within the scope of this invention to precoat the colloidal clay product with tertiary amine oxide and disperse the precoated colloidal clay product in an organic liquid. Thus, this invention also contemplates a particulate minus 48 mesh (Tyler) clay composition useful as an agent for thickening organic liquids and comprising colloidal clay surface coated with a nonionic tertiary amine oxide.

From this description of the invention, it can be seen that one group of tertiary amine oxides within the scope of this invention includes trialkyl amine oxides, as exemplified by alkyl diethyl amine oxide, alkyl dipropyl amine oxide and dialkyl methyl amine oxide wherein the alkyl groups range from $C_8H_{17}$— to $C_{20}H_{42}$—. Another group, which is commercially available, includes the dimethyl alkyl amine oxides wherein the alkyl group ranges from $C_8H_{17}$— to $C_{18}H_{37}$— or $C_{18}H_{35}$—. Still another group, also commercially available, includes the bis(2-hydroxyethyl) alkyl amine oxides. Yet another group of amine oxides within the scope of the invention includes polyethoxylated primary and secondary amines, represented by the formulae:

$$R-N \underset{(C_2H_4O)_mH}{\overset{(C_2H_4O)_nH}{\rightarrow}} O \quad \text{and} \quad R-N \underset{R}{\overset{(C_2H_4O)_nH}{\rightarrow}} O$$

wherein $n$ and $m$ are each integers having a value within the range of 2 to 4.

Nonaqueous liquids which can be thickened or gelled by the combination of colloidal clay and a tertiary amine oxide include mineral oils of low, medium or high viscosity, other hydrocarbon liquids such as kerosene and mineral spirits, ester-type oils such as castor oil, alkyd oils and aromatic solvents, such as xylene and toluene. The clay and tertiary amine oxide can also be used to thicken polar organic liquids suchs as alcohols, ketones, ethers, chlorohydrocarbons, glycols, glycol ethers, glycol ether esters, nitriles, etc.

Any colloidal clay can be used in carrying out this invention. By the term "colloidal clay" is meant a naturally-occurring hydrous alumino-silicate consisting predominantly of particles ½ micron or finer, as determined by the sedimentation method described in a publication by F. H. Norton and S. Speil in J. Am. Ceramic Soc., 21:89 (1938). Species of colloidal clays that are especially preferred are attapulgite (Georgia-Florida fuller's earth), sepiolite, hectorite and sodium montmorillonite (Wyoming bentonite). Some kaolin clays are colloidal and are within the scope of my invention. Several of the clays that are useful are hydrous crystalline magnesium aluminosilicate. Some colloidal clays, especially those of the montmorillonite family, contain appreciable quantities of hydratable alkali cation (sodium in the case of Wyoming bentonite, and lithium in the case of hectorite).

The quantity of clay that is employed is usually within the range of 5% to 25%, preferably 10% to 20%, based on the weight of the organic liquid. Colloidal clays are usually associated with appreciable water, both chemically held water and physically held water. As is known to those in the art, and as described in the patent literature, the presence of appreciable free moisture with a clay, such as attapulgite, is essential to maintain the native colloidal properties of the raw clay. The quantity of physically held water can vary within wide ranges. This is especially true of clays such as attapulgite which are very hygroscopic. For this reason, in referring herein to the quantity of clay, the weight of the clay is always reported on a moisture-free (M.F.) weight basis unless otherwise indicated. Moisture-free clay weight is determined by heating a sample of the clay to essentially constant weight at 225° F. under atmospheric pressure. In accordance with this system for reporting clay weight, 12.5 parts by weight of a colloidal clay containing 20% free moisture must be added to 87.5 parts by weight of organic liquid to provide a system containing "10% clay."

The tertiary amine oxide is employed in amount ranging from about 5% to 50%, preferably 10% to 20%, based on the weight of the clay (on a moisture-free clay weight basis.) When used in amount appreciably less than 10% of the clay weight, the gels may be undesirably thin. When used in amount appreciably in excess of 20% of the moisture-free clay weight, the gels may be lumpy. The amine oxides are usually supplied commercially as solutions of 30% to 65% concentration in hydroxylated solvents such as water, lower alcohols (ethanol or isopropanol) and glycols, such as hexylene glycol. Any of these solutions can be used. However, I prefer to use solutions that are as concentrated as possible. The results are usually appreciably better with the more concentrated solutions since there may be bleeding when the more dilute solutions are used.

For a given quantity of tertiary amine oxide, the consistency of an organic liquid will vary with the quantity of clay. The proportions of tertiary amine oxide and clay should be selected to obtain a system of desired consistency. Liquids which are readily poured or nonpourable gels can be produced with equally good results. The consistency of the product will depend on the proportions of ingredients that are used. Care must be taken to use sufficient clay and tertiary amine oxides to produce gels which do not bleed.

In putting the invention into practice, I prefer to mix the tertiary amine oxide with the organic liquid before adding the clay. As mentioned, the tertiary amine oxides are supplied commercially as solutions and these solutions can be mixed with the organic liquid in suitable agitated equipment. The clay is then added and thoroughly mixed until the clay is dispersed. When attapulgite clay or sepiolite is used, high shear agitation should be used to disperse the clay.

To produce the precoated clay product, the colloidal clay is mixed with a solution of the tertiary amine oxide in suitable proportion and the mixture is dried at a product temperature not to exceed about 250° F. and ground to a suitable degree of fineness, e.g., to 100% passable through a 48 mesh or 100 mesh Tyler screen. The drying can be carried out under conditions such that some residual hydroxylated liquid solvent remains with the amine or, if desired, all or substantially all of the solvent can be removed by the use of heat. At any rate, it is essential when processing clays (such as attapulgite clay) which irreversibly lose their colloidal properties when too much free moisture is eliminated, to maintain sufficient free moisture in the dried product to assure that the clay is still colloidal. In the case of attapulgite clay, this means that the clay should not be dried to a free moisture less than about 7%.

This invention has been described with reference to systems containing organic liquid, colloidal clay and tertiary amine oxide. It will be distinctly understood, however, that the thickened liquids can contain other ingredients. As examples of other ingredients may be mentioned the following: finely divided insoluble particulate matter, such as pigments and pharmaceutical ingredients; and soluble matter, such as dyes or drugs. It is also within the scope of the invention to incorporate small quantities of mineral acids or acetic acid into the liquids thickened with colloidal clay and amine oxide. The incorporation of acid in the system results in a further increase in the viscosity of the system.

The invention and its advantages will be more fully understood by the following examples.

EXAMPLE I (a) To illustrate the superiority of a tertiary amine oxide over the parent tertiary amine when used with colloidal clay to gel a hydrocarbon liquid, mineral spirits was gelled, in accordance with this invention, with colloidal attapulgite and various tertiary alkyl amine oxides. The gels were compared with composition made by substituting analogous tertiary amines for the tertiary amine oxides.

In each case, the amine of amine oxide was thoroughly mixed into the organic liquid at ambient temperature. The clay was slowly added to the mixture and sheared in a Waring Blendor operated at high speed for 3 to 5 minutes. The clay used in each case was Attagel 40, which is a finely divided colloidal attapulgite clay product having a volatile matter content of about 25% and a free moisture content of about 15% (as produced). Gel consistency of spatula stirred samples was evaluated by the half-scale cone penetration method of Hotten and Kibler which is described in Analytical Chemistry, vol. 22, No. 12, page 1574 (1950). Gel consistency, as measured by this system, varies inversely with half-scale cone penetration value.

The results, summarized in Table I, show clearly that the tertiary amine oxides were markedly superior to the corresponding tertiary amines when used with the hydrous colloidal attapulgite clay to gel mineral spirits.

TABLE I.—EFFECT OF TERTIARY AMINE OXIDES ON GELATION OF MINERAL SPIRITS WITH COLLOIDAL ATTAPULGITE CLAY

| Wt. percent moisture-free clay (based on weight of mineral spirits) | Amine oxides or amine | Wt. percent amine or amine oxide (based on moisture-free clay weight)*, percent | Results—Gel characteistics, ½ cone penetration (¹/₁₀ mm.) |
|---|---|---|---|
| 17½ | Lauryl dimethyl amine oxide (as 90% aq. sol.). | 17 | 141 |
| 17½ | Lauryl dimethyl amine | 17 | No gel |
| 17½ | Stearyl dimethyl amine oxide (as 65% aq. sol.). | 36⅔ | 245 |
| 17½ | Stearyl dimethyl amine | 33⅓ | No gel |

*Calculated as 100% amine oxide or amine.

(b) The procedure of part (a) of this example was repeated with dimethyl stearyl amine oxide and Wyoming bentonite and, for purposes of comparison, with the bentonite and dimethyl stearyl amine. The results were similar to the results when the attapulgite clay was used with the amine oxide and the amine.

EXAMPLE II

This example illustrates the gelation of several different organic liquids with Attagel 40 and various tertiary amine oxides within the scope of this invention. The procedure was the same described in the previous example. Results are tabulated in Table II.

TABLE II.—GELATION OF ORGANIC LIQUIDS WITH ATTAGEL 40 AND TERTIARY AMINE OXIDES

| Organic Liquid | Wt. Percent moisture-free clay (based on liquid wt.) | Tertiary amine oxide | Wt. percent amine oxide (based on moisture-free clay weight)* | Gel characteristics, ½ cone penetration (⅒ mm.) |
|---|---|---|---|---|
| Lube oil | 12¾ | Dimethyl stearyl amine oxide | 16 | 102 |
| Toluene | 12¾ | Dimethyl lauryl amine oxide | 12 | 191 |
| Mineral spirits | 17½ | Dimethyl cetyl amine oxide | 20 | 202 |
| Mineral spirits | 17½ | Bis(2-hydroxyethyl) tallow amine oxide. | 15 | 200 |
| Mineral spirits | 17½ | Bis(2-hydroxyethyl) cocamine oxide | 15 | 163 |
| Mineral spirits | 17½ | Bis(2-hydroxyethyl) stearyl amine oxide. | 15 | 165 |
| Toluene | 17½ | Bis(2-hydroxyethyl) tallow amine oxide. | 15 | 169 |
| Toluene | 17½ | Bis(2-hydroxyethyl) cocamine oxide | 15 | 177 |
| Toluene | 17½ | Bis(2-hydroxyethyl) stearyl amine oxide. | 15 | 174 |
| Mineral spirits | 17½ | Dimethyl hexadecylamine oxide | 12 | 160 |

*Calculated as 100% amine oxide.

EXAMPLE III

In accordance with a form of this invention, a portion of mineral spirits gelled to a ½ cone penetration value of 245 with Attagel 40 and dimethyl lauryl amine oxide (Example 1, part (a)) was further thickened to a ½ cone penetration value of 112 by addition of 85% $H_3PO_4$ solution in amount of 0.3%, based on the total weight of the gelled system.

EXAMPLE IV

Still in accordance with this invention, a coated clay product, useful in gelling mineral spirits, is provided by mixing raw attapulgite clay at 56% V.M. with 30% by weight of a 50% aqueous solution of bis(2-hydroxyethyl) cocamine oxide. The mixing is carried out in a paddle-type pug mill. The mixture is dried at a product temperature of about 240° F. to a V.M. of 25% and ground to 100% minus 200 mesh (Tyler) in a hammer mill.

The term "volatile matter" (V.M.) refers to the weight percentage of material that is eliminated when a material is heated to constant weight at 1800° F.

I claim:
1. An organic liquid selected from the group consisting of mineral oil, kerosene, mineral spirits, ester-type oil, alkyld oil, xylene, toluene, alcohol, ketone, ether, chlorohydrocarbon, glycol, glycol ether, and glycol ether ester, said liquid being thickened as a result of having dispersed therein from 5 percent to 25 percent by weight of colloidal clay selected from the group consisting of attapulgite, sepiolite, hectorite and sodium montmorillonite and a tertiary amine oxide in amount from 5 percent to 50 percent, based on the weight of said clay, said tertiary amine oxide having the formula:

wherein R is selected from the group consisting of alkyl and alkenyl having 8 to 20 carbon atoms, and $R_1$ is selected from the group consisting of methyl, ethyl, propyl and hydroxyethyl.

2. The composition of claim 1 wherein said clay is attapulgite.
3. The composition of claim 1 wherein said clay is sodium montmorillonite.
4. The composition of claim 1 wherein said liquid is nonpolar.
5. The composition of claim 1 wherein said liquid is mineral spirits.
6. The composition of claim 1 wherein said liquid is toluene.
7. The composition of claim 1 wherein R is selected from the group consisting of lauryl, myristyl, stearyl and tallow and $R_1$ is hydroxyethyl.
8. The composition of claim 1 wherein R is selected from the group consisting of lauryl, myristyl, stearyl and tallow and $R_1$ is methyl.
9. A finely divided composition useful as an agent to body a hydrocarbon oil which comprises particles of a colloidal clay selected from the group consisting of attapulgite, sepiolite, hectorite and sodium montmorillonite and a tertiary amine oxide in amount from 5 percent to 50 percent, based on the weight of said clay, said tertiary amine oxide having the formula:

wherein R is selected from the group consisting of alkyl and alkenyl having 8 to 20 carbon atoms, and $R_1$ is selected from the group consisting of methyl, ethyl, propyl and hydroxyethyl.

10. The composition of claim 9 wherein said clay is attapulgite.
11. The composition of claim 9 wherein said clay is sodium montmorillonite.
12. The composition of claim 9 wherein said liquid is nonpolar.
13. The composition of claim 9 wherein said liquid is mineral spirits.
14. The composition of claim 9 wherein said liquid is toluene.

References Cited by the Examiner

UNITED STATES PATENTS

| 2,831,809 | 4/1958 | Peterson | 252—25 |
| 2,875,152 | 2/1959 | Van Scoy | 252—28 |
| 3,007,784 | 11/1961 | Ebner | 252—51.5 |

DANIEL E. WYMAN, *Primary Examiner.*

I. VAUGHN, *Assistant Examiner.*